United States Patent
Kokido et al.

(10) Patent No.: US 11,006,087 B2
(45) Date of Patent: May 11, 2021

(54) IMAGE SYNTHESIZING DEVICE AND IMAGE SYNTHESIZING METHOD

(71) Applicant: Mitsubishi Electric Corporation, Tokyo (JP)

(72) Inventors: Noritaka Kokido, Tokyo (JP); Takuya Taniguchi, Tokyo (JP); Kunio Ueda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/642,588

(22) PCT Filed: Oct. 13, 2017

(86) PCT No.: PCT/JP2017/037160
§ 371 (c)(1),
(2) Date: Feb. 27, 2020

(87) PCT Pub. No.: WO2019/073589
PCT Pub. Date: Apr. 18, 2019

(65) Prior Publication Data
US 2020/0351481 A1     Nov. 5, 2020

(51) Int. Cl.
*H04N 7/18*         (2006.01)
*H04N 9/64*         (2006.01)
(Continued)

(52) U.S. Cl.
CPC ......... *H04N 9/646* (2013.01); *G06K 9/00791* (2013.01); *G06T 7/70* (2017.01);
(Continued)

(58) Field of Classification Search
CPC ................ B60R 1/00; B60R 2300/105; B60R 2300/607; B60R 2300/202;
(Continued)

(56) References Cited

U.S. PATENT DOCUMENTS

2002/0196340 A1* 12/2002 Kato .................. B60R 1/00
                                                                                       348/148
2016/0368417 A1* 12/2016 Bassi ................. H04N 5/23293
2017/0195564 A1*  7/2017 Appia .................. H04N 9/045

FOREIGN PATENT DOCUMENTS

JP          3297040 B1    7/2002
JP       2010-283718 A   12/2010
JP        2011-13929 A    1/2011

OTHER PUBLICATIONS

International Search Report for PCT/JP2017/037160 dated Jan. 9, 2018 [PCT/ISA/210].

(Continued)

*Primary Examiner* — Gims S Philippe
(74) *Attorney, Agent, or Firm* — Sughrue Mion, PLLC; Richard C. Turner

(57) ABSTRACT

A synthesized image seen looking down from above the vehicle is compiled by connecting the multiple of overhead images, whereby an existence of a three-dimensional object in the vehicle periphery is determined, a correction value is calculated so as to reduce a difference in luminance and coloring in a luminance and coloring correction reference region in which neighboring overhead images overlap, luminance and coloring correction is carried out using the correction value when an amount of change in the luminance and coloring information formed of the correction is less than a predetermined value, and the images wherein luminance and coloring has been corrected are synthesized by connecting into one image, whereby a beautiful display image with a continuous, smooth joint can be obtained.

16 Claims, 7 Drawing Sheets

(51) Int. Cl.
*G06T 7/70* (2017.01)
*G06K 9/00* (2006.01)
*H04N 5/265* (2006.01)

(52) U.S. Cl.
CPC .............. *H04N 5/265* (2013.01); *H04N 7/181* (2013.01); *G06T 2207/10024* (2013.01); *G06T 2207/30252* (2013.01)

(58) Field of Classification Search
CPC .......... B60R 2300/802; B60R 2300/30; B60R 2300/301; B60R 2300/303; B60R 2300/304; G06T 3/4038; G06T 15/06; G06T 15/205; G06T 7/70; H04N 9/646; H04N 5/265; H04N 7/181; G06K 9/00791
USPC .......................................................... 348/148
See application file for complete search history.

(56) References Cited

OTHER PUBLICATIONS

Chinese Office Action dated Dec. 22, 2020 in Patent Application No. 201780095665.7, 16 pages with translation.
Communication dated Mar. 2, 2021, from the Japanese Patent Office in application No. 2019-547874; 8 pages with translation.

\* cited by examiner

IMAGE SYNTHESIZING DEVICE AND IMAGE SYNTHESIZING METHOD

CROSS REFERENCE TO RELATED APPLICATIONS

This application is a National Stage of International Application No. PCT/JP2017/037160 filed Oct. 13, 2017.

TECHNICAL FIELD

The present invention relates to an image synthesizing device and an image synthesizing method such that images filmed by a multiple of vehicle-mounted cameras are connected, and thereby synthesized into a series of images.

BACKGROUND ART

A system such that a multiple of cameras are mounted on a vehicle, overhead images are compiled by converting coordinates of images filmed in directions looking down from each camera so that camera positions appear to be positions higher than the vehicle, and the multiple of overhead images are connected to obtain a synthesized image that seems exactly as though a whole perimeter of the vehicle is being seen from a high place, has been put to practical use.

This kind of system that synthesizes images filmed by a multiple of cameras into one image is such that, in general, the same make of camera is used, but due to manufacturing variation between the cameras, and because control of automatic exposure compensation, automatic gain control, automatic white balance, and the like, is carried out in each camera, there is a problem in that brightness (luminance) and coloring are discontinuous, particularly at image joints, causing a feeling that something is wrong with the synthesized image.

Therefore, in order that average brightness and coloring coincide in regions in a vicinity of a joint of a synthesized image filmed jointly by neighboring cameras, the brightness and color balance of images filmed by each camera are corrected in, for example, Patent Literature 1. Owing to the correction, a continuous, smooth synthesized image can be obtained to an extent, because of which a feeling that something is wrong with the synthesized image can be restricted to an extent.

CITATION LIST

Patent Literature

Patent Literature 1: Japanese Patent No. 3,257,040

SUMMARY OF INVENTION

Technical Problem

However, the existing technology of Patent Literature 1 is such that a common region in a vicinity of a joint of a synthesized image referred to in order to calculate a correction value is fixed. For example, the correction value is obtained from an average value of pixels of the common region. This means that when a three-dimensional object exists in the common region, a three-dimensional portion is projected so as to extend along a line connecting a camera and the three-dimensional object when carrying out a coordinate conversion on an overhead image, and images after projection in a region filmed commonly by neighboring cameras do not coincide. Consequently, there is a problem with the existing technology of Patent Literature 1 in that appropriate correction is not carried out.

The invention has an object of rendering a vicinity of a boundary between images into an image that is still more continuous and smoother in comparison with an existing image when synthesizing a multiple of images.

Solution to Problem

An image synthesizing device of the invention includes a multiple of periphery monitoring camera devices that are mounted on a vehicle and film a periphery of the vehicle, an image processing device that compiles a synthesized image by synthesizing a multiple of images filmed by the periphery monitoring camera devices, and an image display device that displays the synthesized image, and is characterized by including an image luminance and coloring correcting device that calculates a correction value so as to reduce a difference in luminance and coloring in a luminance and coloring correction reference region in which neighboring images overlap, and a vehicle periphery three-dimensional object determining device that detects a three-dimensional object in the periphery of the vehicle, wherein the image processing device carries out image processing control using the correction value in accordance with a result of the vehicle periphery three-dimensional object determining device detecting the three-dimensional object.

Advantageous Effects of Invention

The invention is such that when synthesizing a multiple of images, an image of a vicinity of a boundary between images can be rendered into a continuous and smooth image that is still closer to nature compared with an existing image display device.

DESCRIPTION OF EMBODIMENTS

First Embodiment

Figure 1:
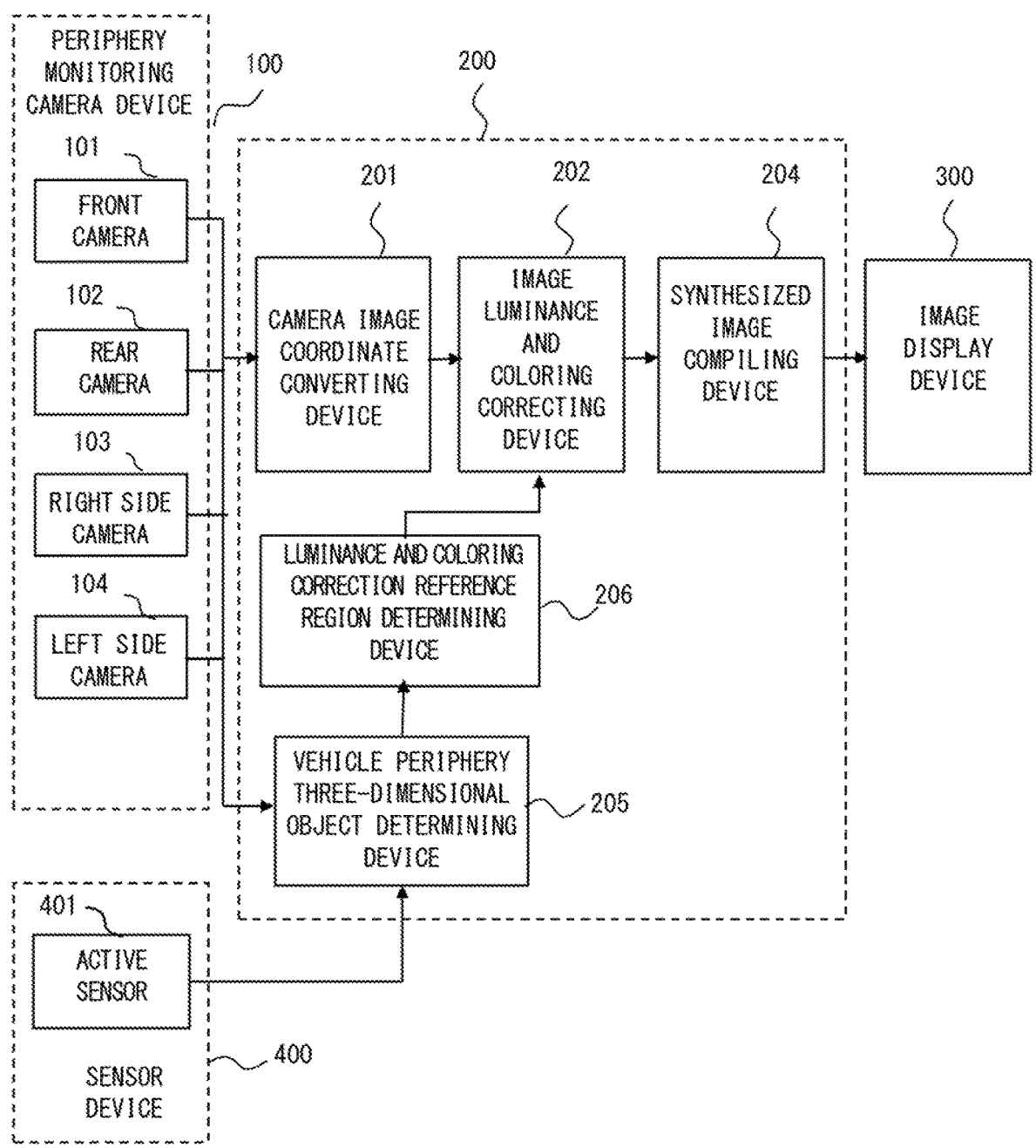
FIG. 1 is a block diagram of an image synthesizing device according to a first embodiment of the invention.

FIG. 1 shows a configuration of an image synthesizing device of a first embodiment of the invention.

An image filmed by periphery monitoring camera device 100 is converted by an image processing device 200 of the invention, an image seen from an overhead virtual viewpoint is synthesized, and the synthesized image is displayed on an image display device 300. Also, a sensor device 400 is included in order to combat an effect of a three-dimensional object in a vehicle periphery.

The periphery monitoring camera device 100 is such that a multiple of optical cameras such as a front camera 101, a rear camera 102, a right side camera 103, and a left side camera 104 are attached to a vehicle so as to cover an own vehicle periphery over 360°, and to partially duplicate a filming range. Each camera is attached facing in a downward-looking direction, and an image is acquired from each direction.

In FIG. 1, the periphery monitoring camera device 100 and the image processing device 200 are shown connected by one signal line, but in actuality, the periphery monitoring camera device 100 and the image processing device 200 are connected so that image information is sent in parallel from each of the multiple of cameras to the image processing device 200. Further, there is a region that overlaps an image filmed by another camera at either end of an image filmed by each camera. Smoothing an image connection by adjusting image brightness and coloring in the overlapping region (a luminance and coloring correction reference region) is a role of the image processing device 200. Although there are four cameras in the embodiment, there may be any number, provided that there are a multiple of cameras for looking down on the own vehicle periphery. In this case too, the invention can be implemented using the same kind of action as in this embodiment.

The image processing device 200 includes a camera image coordinate converting device 201, an image luminance and coloring correcting device 202, a synthesized image compiling device 204, a vehicle periphery three-dimensional object determining device 205, and a luminance and coloring correction reference region determining device 206.

The camera image coordinate converting device 201 carries out a process of converting the coordinates of a vehicle periphery image input from the periphery monitoring camera device 100, and generates an overhead image that appears to be seen from an overhead virtual viewpoint. The coordinate converting process is calculated based on an external parameter representing a position and an orientation of each camera attached to the vehicle, an internal parameter such as a lens focal distance, a calibration parameter such as a lens distortion coefficient, and a view parameter such as a virtual viewpoint position or a display range.

A coordinate conversion table may be compiled in advance based on an external parameter representing the position and the orientation of each camera attached to the vehicle, an internal parameter such as the lens focal distance, a calibration parameter such as the lens distortion coefficient, and a view parameter such as the virtual viewpoint position or the display range, and the process of converting the coordinates of an input image carried out based on the coordinate conversion table. The image luminance and coloring correcting device 202 is notified of the generated overhead image.

The image luminance and coloring correcting device 202, based on luminance and coloring correction reference region information input from the luminance and coloring correction reference region determining device 206, calculates a correction value so that average luminances and colorings in a luminance and coloring correction reference region of neighboring cameras coincide, and corrects luminance and coloring in regions in a vicinity of a joint when synthesizing overhead images from each camera input from the camera image coordinate converting device 201.

The sensor device 400 is configured so that one or a multiple of an active sensor 401, such as an ultrasonic radar, a millimeter-wave radar, or a LIDAR, is attached to a front, a side, or a rear of a vehicle body. The sensor device 400 emits an ultrasonic wave, a millimeter-wave, a laser, or the like, and notifies the vehicle periphery three-dimensional object determining device 205 of reception information regarding a reflected wave.

The vehicle periphery three-dimensional object determining device 205 carries out an image recognizing process with respect to sensor information input from the sensor device 400 and an image input from the periphery monitoring camera device 100, determines whether or not there is a three-dimensional object in the own vehicle periphery based on a detection result from the sensor device 400 and an image recognition detection result, and calculates a position of the three-dimensional object when a three-dimensional object exists.

The image recognizing process may be such that a three-dimensional object is detected using machine learning such as HOG or deep learning (which forms a basis of artificial intelligence, and entails artificial intelligence carrying out complex thought by combining with patterns to date), or may be such that a three-dimensional object is detected using a flow such as an optical flow (wherein movement of an object is represented by a vector in a visual expression (normally temporally continuous digital images)) or motion stereo (a method for calculating a distance to the subject based on "movement on a screen" of a subject shifting to continuous images filmed at slight time intervals and "an amount of filming position displacement" when one camera moves). The vehicle periphery three-dimensional object determining device 205 notifies the luminance and coloring correction reference region determining device 206 of calculated own vehicle periphery three-dimensional object information. A luminance and coloring correction reference region is a region common to neighboring camera images for calculating a correction value used when correcting image luminance and coloring.

The luminance and coloring correction reference region determining device 206, based on own vehicle periphery three-dimensional object information input from the vehicle periphery three-dimensional object determining device 205, decides on a reference region for calculating a correction value used when correcting image luminance and coloring using the image luminance and coloring correcting device 202. When there is no three-dimensional object in a region common to neighboring camera images, a preset common region is adopted as the luminance and coloring correction reference region. When a three-dimensional object exists in a region common to neighboring camera images (a luminance and coloring correction reference region), a common region from which a region in an overhead image corresponding to the position of the three-dimensional object is excluded, that is, a region in which the three-dimensional object does not exist, is adopted as the luminance and coloring correction reference region.

When a three-dimensional object is coordinate converted into an overhead image, a three-dimensional portion is projected so as to extend on a line connecting the camera and the three-dimensional object. Consequently, when there is no three-dimensional object height information when excluding the three-dimensional portion from the common region, the whole of a region farther to the rear than the position of the three-dimensional object on the line connecting the camera and the three-dimensional object is excluded. By so doing, the three-dimensional object can be reliably excluded from the common region, even when the position of the three-dimensional object is known by the active sensor 401, but the height is not known. The image luminance and coloring correcting device 202 is notified of the calculated luminance and coloring correction reference region.

For example, in order to correct so that brightnesses and colorings in regions in a vicinity of a joint of a synthesized image from the front camera 101 and the left side camera 104 coincide, average values of luminance and coloring of all pixels in a luminance and coloring correction reference region of an image from the front camera 101 and an image from the left side camera 104 are calculated. Based on a difference between the calculated average values of luminance and coloring of the image from the front camera 101 and the image from the left side camera 104, a brightness and coloring correction is carried out with respect to all the pixels in regions in the vicinity of the joint when synthesizing the image from the left side camera 104 so that the average value of the left side camera 104 (in this embodiment, with a reference camera taken to be the front camera 101, another camera that is not the reference camera) becomes equal to the average value of the front camera 101. In the same way, a brightness and coloring correction is carried out with respect to regions in a vicinity of a joint of a synthesized image of the front camera 101 and the right side camera 103, the rear camera 102 and the left side camera 104, and the rear camera 102 and the right side camera 103.

Although there is smoothness between neighboring cameras when synthesizing because of the correction with respect to the regions in the vicinity of the joint, a difference occurs in a boundary portion between a region that has been corrected and a region that has not been corrected in an individual corrected camera image, because of which correction is carried out so that the boundary portion also becomes smooth. By so doing, a luminance and coloring corrected image can be generated for each camera. The generated luminance and coloring corrected image is output to the synthesized image compiling device 204.

The synthesized image compiling device 204 synthesizes luminance and coloring corrected images of images from each of the front camera 101, the rear camera 102, the right side camera 103, and the left side camera 104 input from the image luminance and coloring correcting device 202 into one image, and synthesizes an image seen looking down from a virtual viewpoint above the vehicle, thereby generating an output display image. The generated output display image is output to the image display device 300.

The image display device 300 is a vehicle-mounted car navigation system, a back mirror monitor, or the like, and is configured so as to take in and display an output display image output from the synthesized image compiling device 204.

Figure 2:
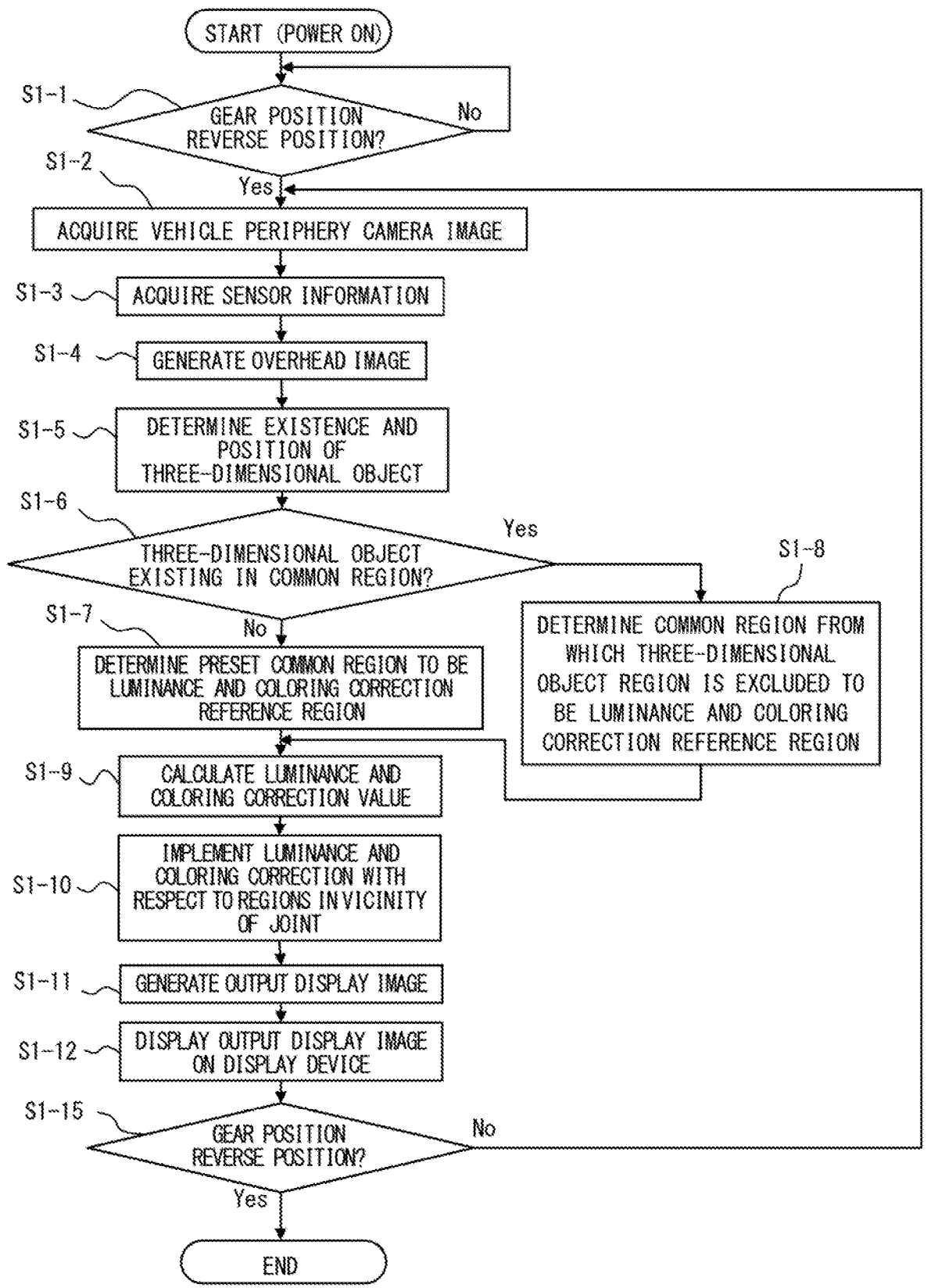
FIG. 2 is a flowchart describing an operation of the first embodiment of the invention.

Next, a flow of an operation of the first embodiment is shown in FIG. 2. Herein, a case wherein the image processing device 200 operates in conjunction with an operation of a gear lever of the vehicle is described.

Firstly, when a gear position of the vehicle is changed to a reverse position (step S1-1), a periphery monitoring camera image and sensor information are acquired. The periphery monitoring camera image is acquired by the periphery monitoring camera device 100 configured of a multiple of optical cameras, such as the front camera 101, the rear camera 102, the right side camera 103, and the left side camera 104, attached to a vehicle exterior (step S1-2), and the camera image coordinate converting device 201 and the vehicle periphery three-dimensional object determining device 205 are notified. The sensor information is such that an ultrasonic wave, a millimeter-wave, a laser, or the like is emitted by the sensor device 400 configured of one or a multiple of the active sensor 401, such as an ultrasonic radar, a millimeter-wave radar, or a LIDAR, attached to the front, the side, or the rear of the vehicle body, reception information regarding a reflected wave is acquired (step S1-3), and the vehicle periphery three-dimensional object determining device 205 is notified.

The camera image coordinate converting device 201 carries out a coordinate converting process, thereby generating an overhead image that appears to be seen from an overhead virtual viewpoint from the vehicle periphery image input from the periphery monitoring camera device 100 (step S1-4). The image luminance and coloring correcting device 202 is notified of the generated overhead image.

Based on the sensor information input from the sensor device 400 and the periphery monitoring camera image input from the periphery monitoring camera device 100, the vehicle periphery three-dimensional object determining device 205 determines whether or not there is a three-dimensional object in the own vehicle periphery based on a detection result from the sensor device 400 and an image recognition detection result obtained from carrying out an image recognizing process, and calculates the position of the three-dimensional object when a three-dimensional object exists (step S1-5). The luminance and coloring correction reference region determining device 206 is notified of the calculated vehicle periphery three-dimensional object information.

The luminance and coloring correction reference region determining device 206 determines from the vehicle periphery three-dimensional object information input from the vehicle periphery three-dimensional object determining device 205 whether or not a three-dimensional object exists in a region common to neighboring camera images for calculating a correction value used when correcting image luminance and coloring (step S1-6). When no three-dimensional object exists, a preset common region is adopted as the luminance and coloring correction reference region (step S1-7). When a three-dimensional object exists, a common region from which a region in an overhead image corresponding to the position of the three-dimensional object is excluded is adopted as the luminance and coloring correction reference region (step S1-8. The image luminance and coloring correcting device 202 is notified of the calculated luminance and coloring correction reference region.

Based on the luminance and coloring correction reference region information input from the luminance and coloring correction reference region determining device 206, the image luminance and coloring correcting device 202 calculates a correction value so that average luminances and colorings of neighboring cameras in the luminance and coloring correction reference region coincide (step S1-9), and corrects luminance and coloring in regions in a vicinity of a joint when synthesizing overhead images from each camera input from the camera image coordinate converting device 201 (step S1-10). The synthesized image compiling device 204 is notified of the generated luminance and coloring corrected image.

The synthesized image compiling device 204 synthesizes luminance and coloring corrected images from the front camera 101, the rear camera 102, the right side camera 103, and the left side camera 104 input from the image luminance and coloring correcting device 202 into one image, and synthesizes an image seen looking down from a virtual viewpoint above the own vehicle, thereby generating an output display image (step S1-11). The image display device 300 is notified of the generated output display image.

On taking in the output display image from the synthesized image compiling device 204, the image display device 300 displays the output display image on a display device such as a vehicle-mounted car navigation system or a back mirror monitor (step S1-12).

After the output image display process of FIG. 2 (step S1-12), it is determined whether or not the gear position of the vehicle is still the reverse position (step S1-13), and if the gear position of the vehicle is still the reverse position, the operation returns again to step S1-2, and the processes from step S1-2 are repeated until the gear position of the vehicle becomes other than the reverse position. When the gear position of the vehicle becomes other than the reverse position, the whole process is ended. In this embodiment, the gear position of the vehicle being the reverse position is adopted as a trigger for starting and ending, but other than this, for example, a process may be started when notification of an overhead view display is received from a car navigation system or the like, and ended when notification of the overhead view display ending is received, or a process may be started when the gear position is a forward position and a vehicle velocity is of a predetermined value or lower, and ended when the vehicle velocity is of a predetermined value or greater.

By using the configuration and the operation shown in the first embodiment, a three-dimensional object is excluded from a region common to neighboring camera images for calculating a correction value used when correcting luminance and coloring, whereby a synthesized image wherein a vicinity of a boundary between images is a continuous, smooth joint, can be provided, with no occurrence of a heretofore known correction deviation caused by a three-dimensional object being projected so as to extend in a coordinate-converted image, and images after projection in a region filmed commonly by neighboring cameras not coinciding.

Second Embodiment

Figure 3:
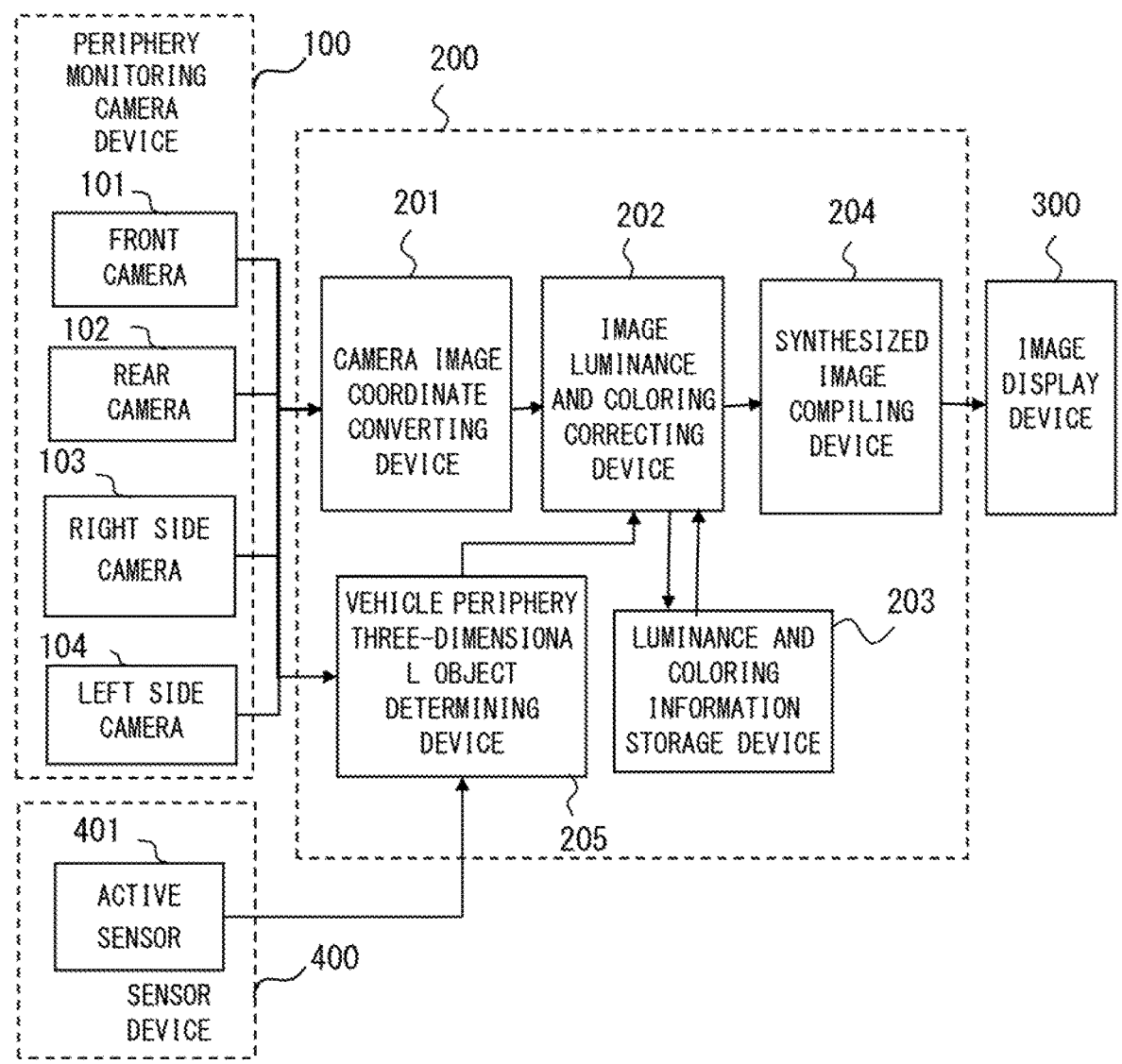
FIG. 3 is a block diagram of an image synthesizing device according to a second embodiment of the invention.

FIG. 3 shows a configuration diagram of a second embodiment of the invention.

In the second embodiment, the luminance and coloring correction reference region determining device 206 of the first embodiment is omitted, and a luminance and coloring information storage device 203 is added. Consequently, the second embodiment is the same as the first embodiment except for the changed portions.

The vehicle periphery three-dimensional object determining device 205 determines whether or not there is a three-dimensional object in the own vehicle periphery based on a detection result from the sensor device 400 and an image recognition detection result, and calculates a position of the three-dimensional object when a three-dimensional object exists. The image luminance and coloring correcting device 202 is notified of the calculated own vehicle periphery three-dimensional object information.

The image luminance and coloring correcting device 202, based on information relating to a three-dimensional object in the own vehicle periphery input from the vehicle periphery three-dimensional object determining device 205, calculates average values of luminance and coloring in a luminance and coloring correction reference region of neighboring cameras, and calculates a correction value so that the calculated average values of luminance and coloring coincide for neighboring cameras. Using the calculated correction value, the image luminance and coloring correcting device 202 corrects luminance and coloring in a region in a vicinity of a joint when synthesizing overhead images from each camera input from the camera image coordinate converting device 201. The correction value calculated by the image luminance and coloring correcting device 202 is output to the luminance and coloring information storage device 203. When a three-dimensional object exists in the vehicle periphery, the most recently applied correction value is input from the luminance and coloring information storage device 203 and, based on the input correction value, luminance and coloring are corrected in regions in a vicinity of a joint when synthesizing overhead images from each camera input from the camera image coordinate converting device 201. The synthesized image compiling device 204 is notified of the generated luminance and coloring corrected image.

On receiving a luminance and coloring correction value from the image luminance and coloring correcting device 202, the luminance and coloring information storage device 203 saves the received luminance and coloring correction value by overwriting the luminance and coloring correction value stored as the latest luminance and coloring correction value. Also, when a three-dimensional object exists in a region common to neighboring camera images for calculating a correction value, the luminance and coloring information storage device 203 notifies the image luminance and coloring correcting device 202 of the latest luminance and coloring correction value.

Figure 4:
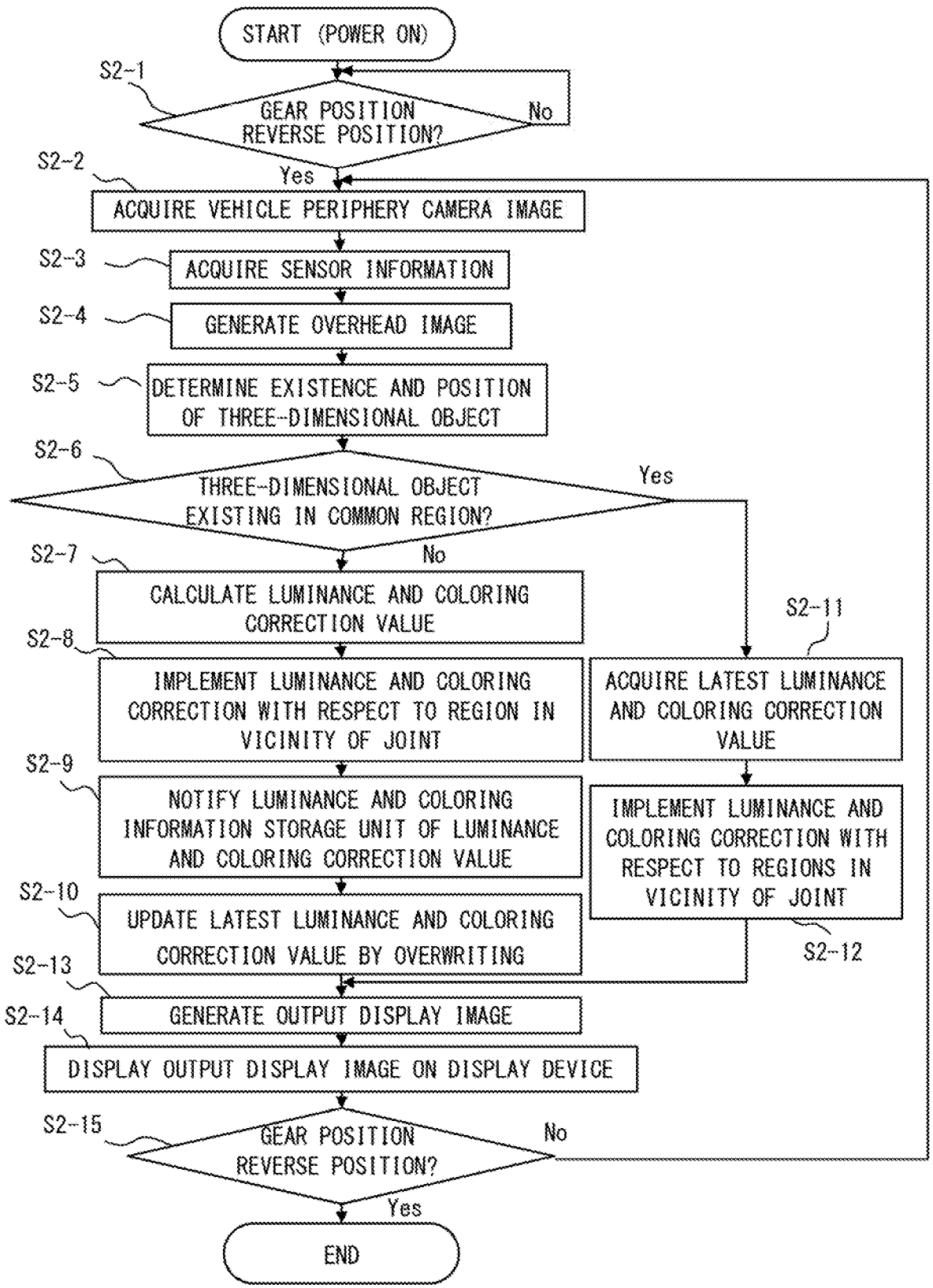
FIG. 4 is a flowchart describing an operation of the second embodiment of the invention.

Next, FIG. 4 shows a flow of an operation of the second embodiment.

Firstly, when a gear position of the vehicle is changed to a reverse position (step S2-1), a periphery monitoring camera image and sensor information are acquired. The periphery monitoring camera image is acquired by the periphery monitoring camera device 100 configured of a multiple of optical cameras, such as the front camera 101, the rear camera 102, the right side camera 103, and the left side camera 104, attached to a vehicle exterior (step S2-2), and the camera image coordinate converting device 201 and the vehicle periphery three-dimensional object determining device 205 are notified. The sensor information is such that an ultrasonic wave, a millimeter-wave, a laser, or the like is emitted by the sensor device 400 configured of one or a multiple of the active sensor 401, such as an ultrasonic radar, a millimeter-wave radar, or a LIDAR, attached to the front, the side, or the rear of the vehicle body, reception information regarding a reflected wave is acquired (step S2-3), and the vehicle periphery three-dimensional object determining device 205 is notified.

The camera image coordinate converting device 201 carries out a coordinate converting process, thereby generating an overhead image that appears to be seen from an overhead virtual viewpoint from the vehicle periphery image input from the periphery monitoring camera device 100 (step S2-4). The image luminance and coloring correcting device 202 is notified of the generated overhead image.

Based on the sensor information input from the sensor device 400 and the periphery monitoring camera image input from the periphery monitoring camera device 100, the vehicle periphery three-dimensional object determining device 205 determines whether or not there is a three-dimensional object in the own vehicle periphery, and calculates the position of the three-dimensional object when a three-dimensional object exists (step S2-5). The calculated own vehicle periphery three-dimensional object information is output to the image luminance and coloring correcting device 202.

The image luminance and coloring correcting device 202, based on the own vehicle periphery three-dimensional object information from the vehicle periphery three-dimensional object determining device 205, determines whether or not a three-dimensional object exists in a region common to camera images for calculating a correction value used when correcting image luminance and coloring (step S2-6). When no three-dimensional object exists (in the case of "No"), the image luminance and coloring correcting device 202 calculates average values of luminance and coloring in a luminance and coloring correction reference region of neighboring cameras, and calculates a correction value so that the calculated average values of luminance and coloring coincide for the neighboring cameras (step S2-7).

Using the calculated correction value, the image luminance and coloring correcting device 202 corrects luminance and coloring in regions in a vicinity of a joint when synthesizing overhead images from each camera input from the camera image coordinate converting device 201 (step S2-8), and the luminance and coloring information storage device 203 is notified of the calculated correction value (step S2-9). When there is a transmission of a luminance and coloring correction value from the image luminance and coloring correcting device 202, the luminance and coloring information storage device 203 saves the received luminance and coloring correction value by overwriting as the latest luminance and coloring correction value (step S2-10). When a three-dimensional object exists (in the case of "Yes"), the image luminance and coloring correcting device 202 takes in the most recently applied correction value from the luminance and coloring information storage device 203 (step S2-11) and, based on the input correction value, corrects luminance and coloring in regions in a vicinity of a joint when synthesizing overhead images from each camera input from the camera image coordinate converting device 201 (step S2-12). The synthesized image compiling device 204 is notified of the generated luminance and coloring corrected image.

The synthesized image compiling device 204 synthesizes luminance and coloring corrected images from the front camera 101, the rear camera 102, the right side camera 103, and the left side camera 104 input from the image luminance and coloring correcting device 202 into one image, and synthesizes an image seen looking down from a virtual viewpoint above the own vehicle, thereby generating an output display image (step S2-13). The generated output display image is output to the image display device 300.

On taking in the output display image from the synthesized image compiling device 204, the image display device 300 displays the output display image on a display device such as a vehicle-mounted car navigation system or a back mirror monitor (step S2-14).

After the output image display process of FIG. 4 (step S2-14), it is determined whether or not the gear position of the vehicle is still the reverse position (step S2-15), and if the gear position of the vehicle is still the reverse position, the operation returns again to step S2-2, and the processes from step S2-2 are repeated until the gear position of the vehicle becomes other than the reverse position. When the gear position of the vehicle becomes other than the reverse position, the whole process is ended. In the second embodiment, in the same way as in the first embodiment, the gear position of the vehicle being the reverse position is adopted as a trigger for starting and ending, but other than this, a process may be started when notification of an overhead view display is received from a car navigation system or the like, and ended when notification of the overhead view display ending is received, or a process may be started when the gear position is a forward position and a vehicle velocity is of a predetermined value or lower, and ended when the vehicle velocity is of a predetermined value or greater.

Using the configuration and the operation described in the second embodiment means that when a three-dimensional object exists in a region common to neighboring camera images for calculating a correction value used when correcting luminance and coloring, correction is carried out using a correction value for a case in which there is no obstacle rather than a correction value being updated, whereby a synthesized image wherein a vicinity of a boundary between images is a continuous, smooth joint can be provided, with no occurrence of a heretofore known correction deviation caused by a three-dimensional object being projected so as to extend in a coordinate-converted image, and images after projection in a region filmed commonly by neighboring cameras not coinciding.

Third Embodiment

Figure 5:
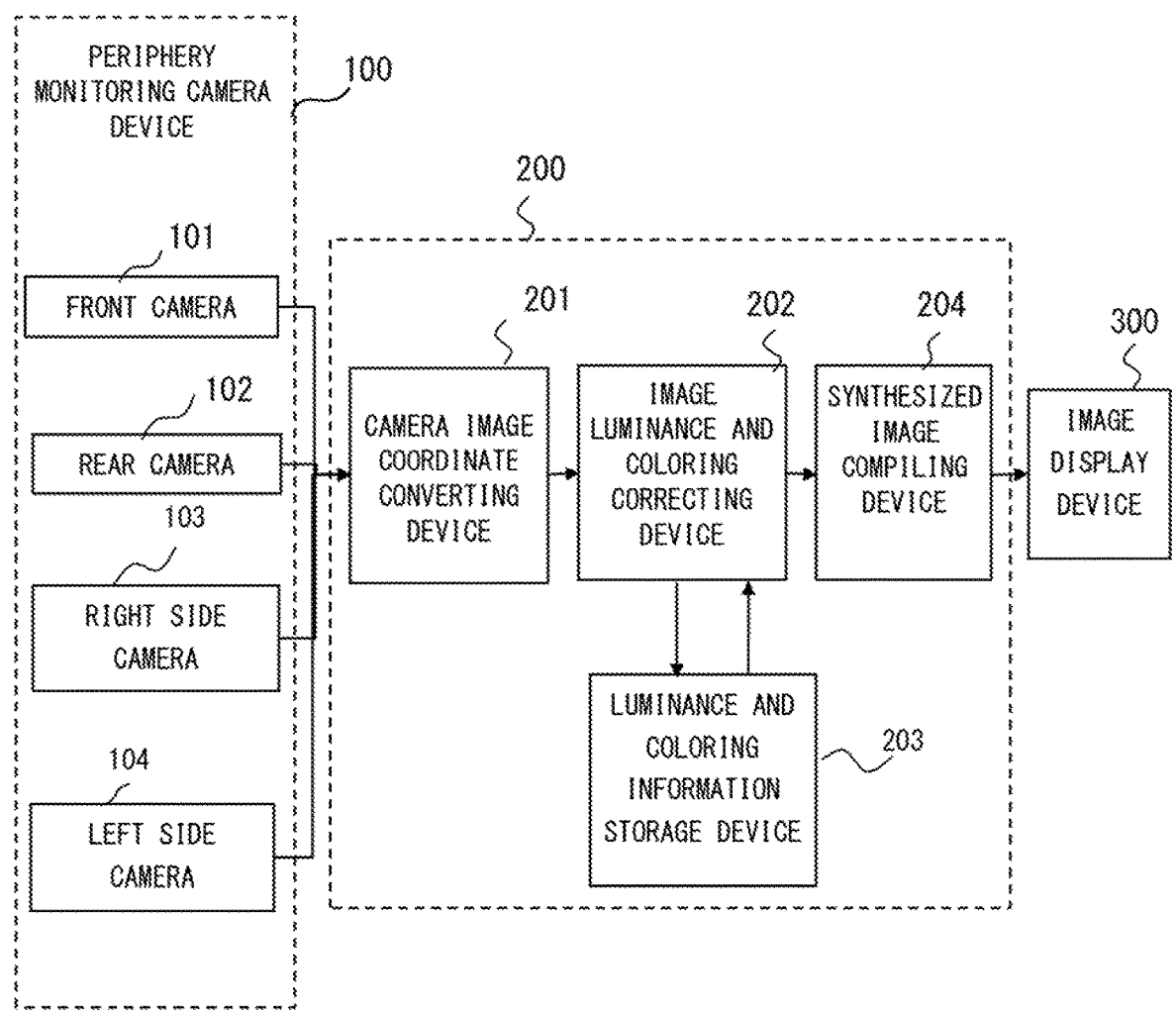
FIG. 5 is a block diagram of an image synthesizing device according to a third embodiment of the invention.

FIG. 5 shows a configuration diagram of a third embodiment of the invention.

In the third embodiment, the sensor device 400 and the vehicle periphery three-dimensional object determining device 205 of the second embodiment are omitted. In the third embodiment, determination of whether or not a three-dimensional object exists in a vehicle periphery changes from a direct determination by the sensor device 400 and the vehicle periphery three-dimensional object determining device 205 to assuming that a three-dimensional object exists in a vehicle periphery in accordance with an extent of a change in an average value of luminance and coloring in a reference region. That is, the image luminance and coloring correcting device 202 is provided with a function of determining whether or not a three-dimensional object exists in a vehicle periphery, whereby an existence of a three-dimensional object is determined in accordance with a degree of change in an average value of luminance and coloring.

Consequently, portions other than the changed portions in the third embodiment are the same as in the second embodiment.

In the third embodiment, a configuration is such that an image filmed by the periphery monitoring camera device 100 is converted by the image processing device 200 of the invention, an image seen from overhead is synthesized, and the synthesized image is displayed on the image display device 300.

The periphery monitoring camera device 100 is such that a multiple of optical cameras such as the front camera 101, the rear camera 102, the right aide camera 103, and the left side camera 104 are attached to a vehicle so as to cover an own vehicle periphery over 360°, and to partially duplicate a filming range. Each camera is attached facing in a downward-looking direction, and an image is acquired from each direction.

In FIG. 5, the periphery monitoring camera device 100 and the image processing device 200 are shown connected by one signal line, but in actuality, the periphery monitoring camera device 100 and the image processing device 200 are connected so that image information is sent in parallel from each of the multiple of cameras to the image processing device 200. Further, there is a region that overlaps an image filmed by another camera at either end of an image filmed by each camera. Smoothing an image connection by adjusting image brightness and coloring in the overlapping region (a luminance and coloring correction reference region) is a role of the image processing device 200.

Although there are four cameras in the third embodiment, there may be any number, provided that there are a multiple of cameras for looking down on the own vehicle periphery. In this case too, the invention can be implemented using the same kind of action as in this embodiment.

The image processing device 200 includes the camera image coordinate converting device 201, the image luminance and coloring correcting device 202, the luminance and coloring information storage device 203, and the synthesized image compiling device 204.

The camera image coordinate converting device 201 carries out a process of converting the coordinates of images from each of the multiple of cameras of the periphery monitoring camera device 100, thereby converting the images into an image in a state seen from overhead.

The image luminance and coloring correcting device 202 calculates a correction value so that average luminances and colorings in a luminance and coloring correction reference region of neighboring cameras coincide, and corrects luminance and coloring in regions in a vicinity of a joint when synthesizing overhead images from each camera input from the camera image coordinate converting device 201.

Specifically, for example, in order to correct so that brightnesses and colorings coincide in regions in a vicinity of a joint of a synthesized image from the front camera 101 and the left side camera 104, average values of luminance and coloring of ail pixels in a luminance and coloring correction reference region of an image from the front camera 101 and an image from the left side camera 104 are calculated. Based on a difference between the calculated average values of luminance and coloring of the image from the front camera 101 and the image from the left side camera 104, a brightness and coloring correction is carried out with respect to all the pixels in regions in the vicinity of the joint when synthesizing the image from the left side camera 104 so that the average value of the left side camera 104 (in this embodiment, with a reference camera taken to be the front camera 101, another camera that is not the reference camera) becomes equivalent to the average value of the front camera 101. In the same way, a brightness and coloring correction is carried out with respect to regions in a vicinity of a joint of a synthesized image of the front camera 101 and the right side camera 103, the rear camera 102 and the left side camera 104, and the rear camera 102 and the right side camera 103.

Although there is smoothness between neighboring cameras when synthesizing because of the correction with respect to the regions in the vicinity of the joint, a difference occurs in a boundary portion between a region that has been corrected and a region that has not been corrected in an individual corrected camera image, because of which correction is carried out so that the boundary portion also becomes smooth. By so doing, a luminance and coloring corrected image can be generated for each camera. The generated luminance and coloring corrected image is output to the synthesized image compiling device 204.

The synthesized image compiling device 204 synthesizes luminance and coloring corrected images of images from each of the front camera 101, the rear camera 102, the right side camera 103, and the left side camera 104 input from the image luminance and coloring correcting device 202 into one image, and synthesizes an image seen looking down from a virtual viewpoint above the vehicle, thereby generating an output display image. The generated output display image is output to the image display device 300.

Also, using the calculated correction value, the image luminance and coloring correcting device 202 corrects luminance and coloring in regions in a vicinity of a joint when synthesizing overhead images from each camera input from the camera image coordinate converting device 201, and outputs the calculated correction value to the luminance and coloring information storage device 203.

When there is a transmission of a luminance and coloring correction value from the image luminance and coloring correcting device 202, the luminance and coloring information storage device 203 saves the received luminance and coloring correction value by overwriting as the latest luminance and coloring correction value. Also, the luminance and coloring information storage device 203 outputs the latest luminance and coloring correction value saved by overwriting in accordance with a request from the image luminance and coloring correcting device 202.

The image display device 300 is a vehicle-mounted car navigation system, a back mirror monitor, or the like, and is configured so as to take in and display an output display image output from the synthesized image compiling device 204.

Figure 6:
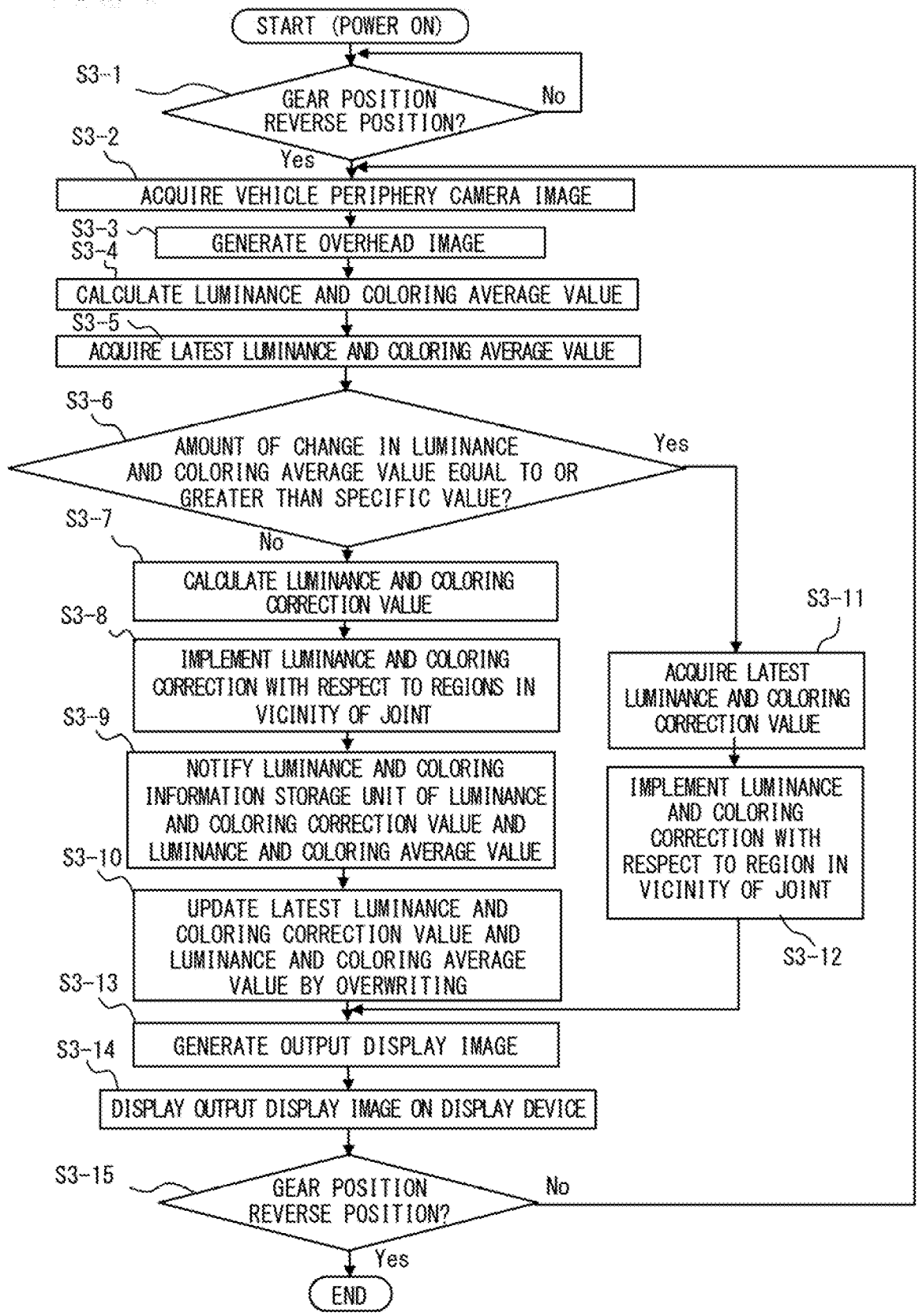
FIG. 6 is a flowchart describing an operation of the third embodiment of the invention.

Next, a flow of an operation of the third embodiment is shown in FIG. 6. Herein, a case wherein the image processing device 200 operates in conjunction with an operation of the gear lever of the vehicle is described.

Firstly, when a gear lever position (gear position) of the vehicle is changed to a reverse position (step S3-1), a periphery monitoring camera image is acquired. The periphery monitoring camera image is acquired by filming images using the periphery monitoring camera device 100 configured of a multiple of optical cameras, those being the front camera 101, the rear camera 102, the right side camera 103, and the left side camera 104, attached to a vehicle exterior (step S3-2), and the camera image coordinate converting device 201 is notified.

The camera image coordinate converting device 201 carries out a coordinate converting process, thereby generating an overhead image that appears to be seen from an overhead virtual viewpoint from the vehicle periphery image input from the periphery monitoring camera device 100 (step S3-3). The image luminance and coloring correcting device 202 is notified of the generated overhead image.

The image luminance and coloring correcting device 202 calculates an average value of luminance and coloring in a luminance and coloring correction reference region of neighboring cameras from camera images input from the camera image coordinate converting device 201 (step S3-4). The image luminance and coloring correcting device 202 takes in the latest average value of luminance and coloring for a case in which a correction value has been applied from the luminance and coloring information storage device 203 (step S3-5), and determines whether or not a change from a calculated average value of luminance and coloring in the luminance and coloring correction reference region is of a predetermined value or greater (step S3-6). When the change in the average value of luminance and coloring is less than the predetermined value (in the case of "No"), the image luminance and coloring correcting device 202 calculates a correction value so that the average values of luminance and coloring coincide for neighboring cameras (step S3-7).

Using the calculated correction value, the image luminance and coloring correcting device 202 corrects luminance and coloring with respect to pixel data in regions in a vicinity of a joint when synthesizing overhead images from each camera input from the camera image coordinate converting device 201 (step S3-8), and notifies the luminance and coloring information storage device 203 of the calculated correction value and the average value of luminance and coloring (step S3-9). When there is a transmission of a luminance and coloring correction value and a luminance and coloring average value from the image luminance and coloring correcting device 202, the luminance and coloring information storage device 203 saves the received luminance and coloring correction value and luminance and coloring average value by overwriting as the latest luminance and coloring correction value and luminance and coloring average value (step S3-10). When the change in the average value of luminance and coloring is equal to or greater than the predetermined value (in the case of "Yes"), the image luminance and coloring correcting device 202 takes in the most recently applied correction value from the luminance and coloring information storage device 203 (step S3-11) and, based on the input correction value, corrects luminance and coloring in regions in a vicinity of a joint when synthesizing overhead images from each camera input from the camera image coordinate converting device 201 (step S3-12). The synthesized image compiling device 204 is notified of the generated luminance and coloring corrected image.

The synthesized image compiling device 204 synthesizes luminance and coloring corrected images from the front camera 101, the rear camera 102, the right side camera 103, and the left side camera 104 input from the image luminance and coloring correcting device 202 into one image, and synthesizes an image seen looking down from a virtual viewpoint above the vehicle, thereby generating an output display image (step S3-13). The image display device 300 is notified of the generated output display image.

The image display device 300 takes in the output display image from the synthesized image compiling device 204, and displays the output display image on a display device such as a vehicle-mounted car navigation system or a back mirror monitor (step S3-14).

After the output image display process of FIG. 6 (step S3-14), it is determined whether or not the gear lever position of the vehicle is still the reverse position (step S3-1S), and if the gear position of the vehicle is still the reverse position, the operation returns again to step S3-2, and the processes from step S3-2 are repeated until the gear position of the vehicle becomes other than the reverse position. When the gear position of the vehicle becomes other than the reverse position, the whole process is ended. In this embodiment, the gear position of the vehicle being the reverse position is adopted as a trigger for starting and ending, but other than this, a process may be started when notification of an overhead view display is received from a car navigation system or the like, and ended when notification of the overhead view display ending is received, or an image processing operation may be started when the gear position is a forward position and a vehicle velocity is of a predetermined value or lower, and ended when the vehicle velocity is of a predetermined value or greater.

Using the configuration and the operation described in the third embodiment means that when an amount of change is large in a region common to neighboring camera images for calculating a correction value used when correcting luminance and coloring, luminance and coloring correction is carried out by taking over a past correction value wherein an amount of change is small, whereby an effect of a three-dimensional object that is a cause of the amount of change increasing is avoided, a correction value used when an amount of change is small, as in the case of a road or the like, can continue to be applied, the three-dimensional object is not projected so as to extend in a coordinate-converted image, there is no occurrence of correction deviation caused by images after projection in a region filmed commonly by neighboring cameras not coinciding, and a synthesized image wherein a vicinity of a boundary between images is a continuous, smooth joint can be provided.

Figure 7:
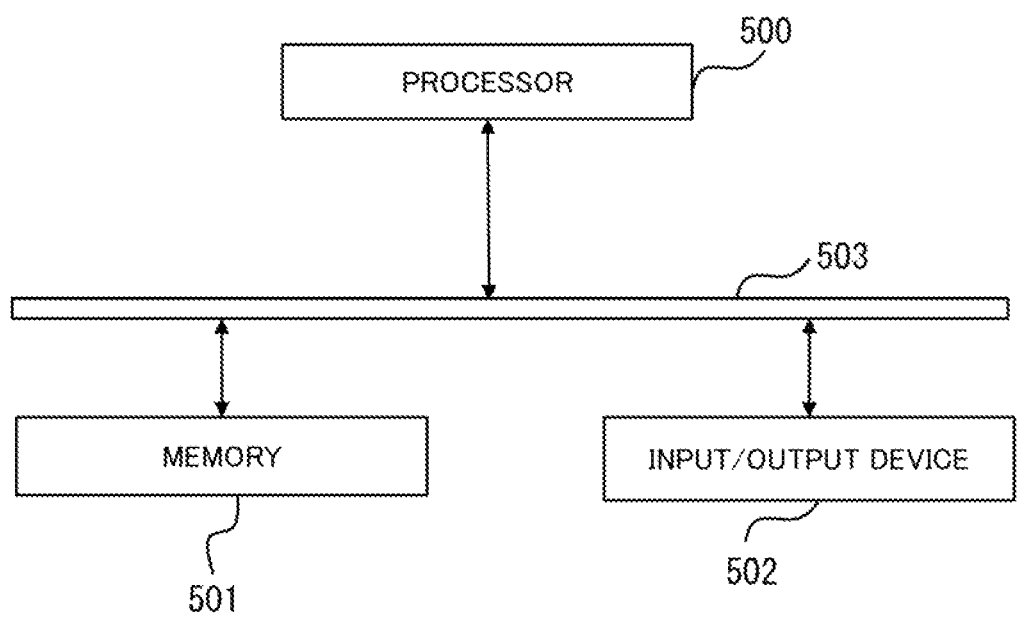
FIG. 7 is a configuration diagram showing hardware that realizes functions of the block diagrams.

The device in each of the configuration diagrams shown in FIG. 1, FIG. 3, and FIG. 5 is realized by hardware shown in FIG. 7. That is, a processor 500, a memory 501 in which programs and data are accumulated, and an input/output device 502 are connected by a data bus 503, and data processing and data transmission are carried out by control by the processor 500.

Also, constituent components shown in the embodiments can be freely combined, and an arbitrary constituent component of an embodiment can be changed or omitted as appropriate, without departing from the scope of the invention.

The invention claimed is:

1. An image synthesizer, comprising:
periphery monitoring cameras that are mounted on a vehicle and film a periphery of the vehicle;
an image processor that compiles a synthesized image by synthesizing a plurality of images filmed by the periphery monitoring cameras, respectively; and
an image display device that displays the synthesized image,
wherein the image processor includes:
an image luminance and color corrector that calculates a correction value so as to reduce a difference in luminance and coloring in a luminance and coloring correction reference region in which neighboring images among the plurality of images overlap, and
a vehicle periphery three-dimensional object decision device that determines whether a three-dimensional object exists in the periphery of the vehicle, and
wherein, based on the three-dimensional object being in the luminance and coloring correction reference region, the image processor carries out image processing control using the correction value in a region of the luminance and coloring correction reference region from which a region of an image corresponding to the three-dimensional object is excluded.

2. The image synthesizer according to claim 1, wherein the vehicle periphery three-dimensional object decision device determines an existence and a position of the three-dimensional object in the periphery of the vehicle based on a result of a detection by a sensor device configured of at least one active sensor.

3. The image synthesizer according to claim 1, wherein the vehicle periphery three-dimensional object decision device determines an existence and a position of the three-dimensional object in the periphery of the vehicle based on an image recognition process carried out on an image filmed by the periphery monitoring camera.

4. The image synthesizer according to claim 1, comprising a sensor device that detects the three-dimensional object in the periphery of the vehicle,
wherein the vehicle periphery three-dimensional object decision device calculates a position of the three-dimensional object from a result of a detection of the three-dimensional object by the sensor device and an image from the periphery monitoring camera, and adopts the region from which the region in the image corresponding to the position of the three-dimensional object is excluded as the luminance and coloring correction reference region when the position of the three-dimensional object is within the luminance and coloring correction reference region.

5. The image synthesizer according to claim 4, wherein the sensor device is an active sensor.

6. The image synthesizer according to claim 1, further comprising a luminance and coloring information storage device that stores luminance and coloring information formed of the correction value calculated by the image luminance and color corrector,
wherein luminance and coloring correction is carried out using a most recently applied correction value stored in the luminance and coloring information storage device when a position of the three-dimensional object determined by the vehicle periphery three-dimensional object decision device is within the luminance and coloring correction reference region.

7. The image synthesizer according to claim 1, wherein the image luminance and color corrector calculates the correction value in a region in which no three-dimensional object exists when a position of the three-dimensional object determined by the vehicle periphery three-dimensional object decision device is in a region common to the neighboring images for calculating the correction value.

8. The image synthesizer according to claim 1, wherein, based on the three-dimensional object being in a region common to the neighboring images for calculating the correction value, the image luminance and color corrector carries out luminance and coloring correction by using past luminance and coloring correction values of a case in which there was no three-dimensional object determined for both of the neighboring images.

9. The image synthesizer according to claim 1, wherein a determination by the vehicle periphery three-dimensional object decision device is carried out in accordance with an amount of change in the luminance and coloring caused by the correction value in the image luminance and color corrector.

10. The image synthesizer according to claim 9, further comprising a luminance and coloring information storage device that stores luminance and coloring information formed of the correction value calculated by the image luminance and color corrector,
wherein luminance and coloring correction is carried out using a most recently applied correction value stored in the luminance and coloring information storage device when the amount of change in the luminance and coloring information formed of the correction value is of a predetermined value or greater.

11. An image synthesizer, comprising:
periphery monitoring camera devices that film a periphery of a vehicle;
an image processor that calculates a correction value for performing luminance and coloring correction in a plurality of images filmed by the periphery monitoring camera devices, respectively, and compiles a synthesized image by synthesizing the plurality of images;
a luminance and coloring information storage device that stores luminance and coloring information comprising the correction value; and
an image display device that displays the synthesized image,
wherein the image processor includes:
a change amount detector that detects an amount of change in luminance and coloring in a common region, which is common to neighboring images among the plurality of images, and
an image luminance and color corrector that, when the amount of change in the common region is equal to or less than a threshold, calculates a new correction value based on luminance and coloring values of pixels of the neighboring images and performs the luminance and coloring correction using the new correction value, and, when the amount of change is equal to or greater than the threshold, carries out the luminance and coloring correction using the stored correction value, and wherein the image processor synthesizes the plurality of images corrected by the image luminance and color corrector into one image.

12. An image synthesizing method of an image synthesizer mounted on a vehicle, the image synthesizing method comprising:
filming objects in a periphery of the vehicle;
compiling a plurality of images based on the filmed objects; and
compiling a synthesized image based one the plurality of images;
calculating a correction value for reducing a difference in luminance and coloring in a luminance and coloring correction reference region in which neighboring images among the plurality of images overlap; and
based on a three-dimensional object existing in the luminance and coloring correction reference region, performing image processing control using the correction value in a region of the luminance and coloring correction reference region from which a region of an image corresponding to the three-dimensional object is excluded.

13. The image synthesizing method according to claim 12, further comprising:
detecting the three-dimensional object in the periphery, of the vehicle; and
calculating a position of the three-dimensional object from a result of the detecting and the plurality of images,
wherein a region from which a region in the image corresponding to the position of the three-dimensional object is excluded is adopted as the luminance and coloring correction reference region when the position of the three-dimensional object is within the luminance and coloring correction reference region.

14. The image synthesizing method according to claim 13, wherein luminance and coloring information formed of the calculated correction value is stored, and
luminance and coloring correction is carried out using a most recently applied stored correction value when an amount of change in the luminance and coloring information formed of the correction value is of a predetermined value or greater.

15. The image synthesizing method according to claim 12, further comprising:
detecting the three-dimensional object in the periphery of the vehicle.

16. The image synthesizing method according to claim 15, further comprising:
calculating a position of the three-dimensional object based on a result of the detecting and the plurality of images,
wherein luminance and coloring correction is carried out using a most recently applied stored correction value when the position of the three-dimensional object is within a region in which the neighboring images overlap.

\* \* \* \* \*